(12) United States Patent
Hwang

(10) Patent No.: US 11,691,603 B2
(45) Date of Patent: Jul. 4, 2023

(54) METHOD OF CONTROLLING DRIVING OF A VEHICLE USING AN IN-WHEEL SYSTEM

(71) Applicants: HYUNDAI MOTOR COMPANY, Seoul (KR); KIA MOTORS CORPORATION, Seoul (KR)

(72) Inventor: Sung Wook Hwang, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 425 days.

(21) Appl. No.: 16/700,313

(22) Filed: Dec. 2, 2019

(65) Prior Publication Data

US 2020/0101955 A1     Apr. 2, 2020

Related U.S. Application Data

(62) Division of application No. 15/607,524, filed on May 28, 2017, now Pat. No. 10,562,502.

(30) Foreign Application Priority Data

Dec. 9, 2016    (KR) ........................ 10-2016-0167630

(51) Int. Cl.
    *B60T 8/1755*      (2006.01)
    *B60K 7/00*      (2006.01)
    (Continued)

(52) U.S. Cl.
    CPC ........ *B60T 8/17551* (2013.01); *B60K 7/0007* (2013.01); *B60T 8/17558* (2013.01);
    (Continued)

(58) Field of Classification Search
    CPC ............ B60T 8/17551; B60T 8/17558; B60K 7/0007; B60W 10/08; B60W 10/184;
    (Continued)

(56) References Cited

U.S. PATENT DOCUMENTS 8,783,390 B2 *   7/2014   Maeda ............... B60G 17/0195
                                                                                                                            180/242
8,983,723 B2      3/2015   Katsuyama
    (Continued)

FOREIGN PATENT DOCUMENTS

CN          1796204 A      7/2006
CN        101189149 A      5/2008
    (Continued)

OTHER PUBLICATIONS

Office Action cited in Chinese application No. 201710473885.0; dated Aug. 31, 2021; 14 pp.
(Continued)

*Primary Examiner* — Nga X Nguyen
(74) *Attorney, Agent, or Firm* — Lempia Summerfield Katz LLC

(57) ABSTRACT

A method of controlling driving of a vehicle using an in-wheel system includes: calculating a time to collision (TTC) by dividing a distance between the vehicle and an obstacle located in front of the vehicle by relative velocity; determining whether the vehicle enters a braking avoidance section, based on the calculated TTC; and generating, by a motor mounted in each wheel, braking force of a brake by an amount of shortage of braking force of the brake compared with a demanded braking force if the vehicle enters the braking avoidance section.

4 Claims, 6 Drawing Sheets

(51) Int. Cl.
  *B60W 30/04* (2006.01)
  *B60W 10/08* (2006.01)
  *B60W 10/184* (2012.01)

(52) U.S. Cl.
  CPC .......... *B60W 10/08* (2013.01); *B60W 10/184* (2013.01); *B60W 30/04* (2013.01); *Y02T 10/72* (2013.01)

(58) Field of Classification Search
  CPC ...... B60W 30/04; B60W 10/20; B60W 30/08; B60W 40/105; B60W 40/109; B60W 40/114; Y02T 10/72; Y02T 10/64; B60L 2240/423; B60L 2240/429; B60L 15/2009; B60L 15/20; B60L 3/0015
  See application file for complete search history.

(56) References Cited

U.S. PATENT DOCUMENTS

| | | | |
|---|---|---|---|
| 9,272,710 B2 | 3/2016 | Jeon et al. | |
| 9,840,242 B2 | 12/2017 | Bretzigheimer et al. | |
| 2008/0269997 A1* | 10/2008 | Ezoe | B60T 7/22 |
| | | | 701/70 |
| 2010/0174463 A1 | 7/2010 | Uragami et al. | |
| 2012/0083983 A1* | 4/2012 | Danz | B60T 8/885 |
| | | | 701/70 |
| 2012/0245776 A1* | 9/2012 | Okada | B60L 15/20 |
| | | | 701/22 |
| 2013/0218388 A1 | 8/2013 | Katsuyama | |
| 2014/0350813 A1* | 11/2014 | Jeon | G08G 1/166 |
| | | | 701/70 |
| 2015/0158471 A1* | 6/2015 | Ezoe | B60T 7/22 |
| | | | 701/70 |
| 2015/0232090 A1 | 8/2015 | Jeon et al. | |
| 2016/0185325 A1* | 6/2016 | Ike | B60T 8/17558 |
| | | | 701/70 |
| 2016/0264108 A1* | 9/2016 | Harada | B60W 30/0956 |
| 2016/0311416 A1 | 10/2016 | Bretzigheimer et al. | |
| 2016/0311428 A1 | 10/2016 | Kizumi | |
| 2016/0347181 A1* | 12/2016 | Yamakado | B60L 15/2009 |

FOREIGN PATENT DOCUMENTS

| | | |
|---|---|---|
| CN | 102815298 A | 12/2012 |
| CN | 103153728 A | 6/2013 |
| CN | 105813909 A | 7/2016 |
| DE | 102012210130 A1 | 12/2013 |
| KR | 20090062321 A | 6/2009 |
| KR | 20120024170 | 3/2012 |
| KR | 20130026328 | 3/2013 |
| KR | 20140136666 A | 12/2014 |
| KR | 101519287 B1 | 5/2015 |

OTHER PUBLICATIONS

Office Action cited in corresponding Korean patent application No. KR 10-2016-0167630; dated Apr. 19, 2022; 10pp.
Notice of Allowance cited in corresponding Chinese application No. 201710473885.0; dated Mar. 9, 2022; 6 pp.

* cited by examiner

METHOD OF CONTROLLING DRIVING OF A VEHICLE USING AN IN-WHEEL SYSTEM

CROSS-REFERENCE TO RELATED APPLICATIONS

This application is a division of U.S. patent application Ser. No. 15/607,524 entitled "METHOD OF CONTROLLING DRIVING OF A VEHICLE USING AN IN-WHEEL SYSTEM" and filed May 28, 2017, and which claims priority to and the benefit of Korean Patent Application No. 10-2016-0167630, filed on Dec. 9, 2016 in the Korean Intellectual Property Office. The entire contents of these prior filed applications are incorporated herein by reference.

BACKGROUND

Technical Field

The present disclosure relates to a method of controlling driving of a vehicle using an in-wheel system, and more particularly, to a technique that improves performance of avoiding a collision with an obstacle.

Description of Related Art

An in-wheel system for a vehicle refers to a system that independently controls each wheel with a motor (or an in-wheel motor) mounted at each wheel of an electric vehicle using electricity as a power source.

In the vehicle equipped with the in-wheel system, the utilization of space may be improved by mounting a motor in each wheel such that a driving system is simple compared with a vehicle including one main driving motor. In addition, movement performance of the vehicle may be improved by mounting a motor in each wheel such that torque supplied by each motor to each wheel is independently adjusted.

Furthermore, a high braking gain and steering gain may be obtained by adjusting the torque of each wheel independently. A complex power transmission device such as a transmission, a differential gear, or the like may also be omitted by independently adjusting the torque of each wheel.

As a result, the vehicle equipped with the in-wheel system may have high braking performance because braking force (braking force operating on the same principle as the engine brake) generated by a motor is added to braking force generated by a brake during braking. In addition, the vehicle may have high steering performance by adjusting torque of a motor mounted in each wheel during steering of the vehicle.

A conventional vehicle's collision avoidance technology generates a lateral distance gain by adjusting damping force of a front/rear wheel of the vehicle during steering to avoid a collision with an obstacle. For example, the collision avoidance technology generates the lateral distance gain by adjusting a damper of the front wheel of the vehicle to be in a soft state and by adjusting a damper of the rear wheel to be in a hard state during steering.

The conventional technology has limited performance because the conventional technology generates the lateral distance gain through adjustment of the damping force.

SUMMARY

The disclosed embodiments solve the above-mentioned problems occurring in the prior art while advantages achieved by the prior art are maintained intact.

An embodiment of the present disclosure provides a driving controlling method of a vehicle using an in-wheel system, which can improve performance of avoiding a collision with an obstacle by independently controlling a motor mounted in or at each wheel of an electric vehicle such that the collision with the obstacle is avoided.

Objects of the present disclosure are not limited to the above-mentioned object. Other objects and advantages of the present disclosure that are not mentioned will be understood from the following description and embodiments of the present disclosure. In addition, it will be easily understood that the objects and advantages of the disclosure are realized by means and combinations described in the appended claims.

According to an aspect of the present disclosure, a method of controlling driving of a vehicle using an in-wheel system includes determining whether the vehicle enters a steering avoidance section, based on driving information of the vehicle. The method includes verifying a detailed or specific section in the steering avoidance section, if the vehicle enters the steering avoidance section. The method also includes controlling torque of a motor mounted in or at each wheel to satisfy yaw moment required in the verified detailed or specific section.

According to an embodiment, the determining of whether the vehicle enters the steering avoidance section may include determining whether the vehicle enters the steering avoidance section, based on at least one of a yaw rate, lateral acceleration, vehicle speed, a steering angle, or steering wheel angular velocity. In other words, the determining of whether the vehicle enters the steering avoidance section may include determining that the vehicle enters the steering avoidance section, if: a difference between the yaw rate and a reference value of the yaw rate (hereinafter referred to as a "yaw rate error") exceeds a first threshold value; if the lateral acceleration exceeds a second threshold value, which is a value obtained by multiplying the yaw rate error and the lateral acceleration exceeds '0'; if the vehicle speed exceeds a third threshold value; if a differential value of the lateral acceleration exceeds a fourth threshold value; if the steering angle exceeds a fifth threshold value; and if the steering wheel angular velocity exceeds a sixth threshold value.

According to an embodiment, the verifying of the detailed or specific section may include: determining that a current section of the vehicle, i.e., where the vehicle is located in the steering avoidance section, is a first steering section, if a yaw rate error exceeds a first threshold value; determining that the current section of the vehicle is a second steering section, if a time period in which the yaw rate error is greater than a seventh threshold value (that is greater than the first threshold value) is maintained for a critical time or if the yaw rate error greater than the seventh threshold value continuously increases for the critical time; and determining that the current section of the vehicle is a third steering section, if a time period in which the yaw rate error is greater than an eighth threshold value (that is greater than the seventh threshold value) is maintained for the critical time or if the yaw rate error greater than the eighth threshold value continuously increases for the critical time.

According to an embodiment, the controlling of the torque of the motor may include, in a first steering section, maintaining a driving force of a cornering-inside front wheel and a driving force of each of a cornering-outside front wheel and a cornering-outside rear wheel. The controlling of the torque of the motor may also include generating a braking force of a motor mounted in or at a cornering-inside rear wheel, in the first steering section.

According to an embodiment, the controlling of the torque of the motor may include, in a second steering section, maintaining a driving force of each of a cornering-outside front wheel and a cornering-outside rear wheel. The controlling of the torque of the motor may also include, in the second steering section, generating a braking force of a motor mounted in or at a cornering-inside front wheel and a braking force of a motor mounted in or at a cornering-inside rear wheel. In this case, the braking force of the motor mounted in or at the cornering-inside front wheel may be less than the braking force of the motor mounted in or at the cornering-inside rear wheel.

According to an embodiment, the controlling of the torque of the motor may include, in a third steering section, decreasing a driving force of a motor mounted in or at a cornering-outside front wheel and increasing a driving force of a motor mounted in or at a cornering-outside rear wheel. The controlling of the torque of the motor may also include, in the third steering section, generating a braking force of a motor mounted in or at a cornering-inside front wheel and a braking force of a motor mounted in or at a cornering-inside rear wheel. In this case, the braking force of the motor mounted in or at the cornering-inside front wheel may be less than the braking force of the motor mounted in or at the cornering-inside rear wheel.

According to an embodiment, the method may further include stabilizing movement of the vehicle after the controlling of the torque of the motor.

According to an embodiment, the stabilizing of the movement may include performing movement stabilization of the vehicle if lateral acceleration of the vehicle is less than a ninth threshold value and a yaw rate error is greater than a tenth threshold value or if a roll angle is greater than an eleventh threshold value. The stabilizing of the movement may include: maintaining a driving force of each of a motor mounted in or at a cornering-inside front wheel of the vehicle and a motor mounted in or at a cornering-inside rear wheel of the vehicle; maintaining a driving force of a motor mounted in or at a cornering-outside rear wheel of the vehicle; and generating a braking force of a motor mounted in or at a cornering-outside front wheel of the vehicle.

According to an embodiment, the stabilizing of the movement may include performing movement stabilization of the vehicle if a lateral acceleration of the vehicle is less than a ninth threshold value and a slip angle of the vehicle is greater than a twelfth threshold value. The stabilizing of the movement may include maintaining driving force of each of a motor mounted in or at a cornering-inside front wheel of the vehicle and a motor mounted in or at a cornering-inside rear wheel of the vehicle. The stabilizing of the movement may also include generating a braking force of each of a motor mounted in or at a cornering-outside front wheel of the vehicle and a motor mounted in or at a cornering-outside rear wheel of the vehicle.

According to another aspect of the present disclosure, a method of controlling driving of a vehicle using an in-wheel system may include: calculating time to collision (TTC) by dividing a distance between an obstacle located in front of the vehicle and the vehicle by relative velocity; determining whether the vehicle enters a braking avoidance section, based on the calculated TTC; and generating, by a motor mounted in or at each wheel, a braking force of a brake by an amount of shortage of braking force of the brake compared with a demanded braking force, if the vehicle enters the braking avoidance section. The braking avoidance section may be divided into a first braking section, a second braking section, and a third braking section, based on the TTC.

According to an embodiment, the generating of the braking force by the motor mounted in or at each wheel may include generating, by the motor mounted in or at each wheel, the braking force within a first limit value in the first braking section.

According to an embodiment, the generating of the braking force of the brake by the motor mounted in or at each wheel may include generating, by the motor mounted in each wheel, the braking force within a second limit value (that is greater than the first limit value) in the second braking section.

According to an embodiment, the generating of the braking force of the brake by the motor mounted in or at each wheel may include generating, by the motor mounted in each wheel, the braking force without limit in the third braking section.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

The above and other objects, features, and advantages of the present disclosure will be more clearly understood from the following detailed description taken in conjunction with the accompanying drawings. Thus, the technical idea of the present disclosure will be understood by those having ordinary skill in the art. Further, in the following description, where it is determined that the detailed description of the related art would obscure the gist of the present disclosure, the description thereof will be omitted. Hereinafter, embodiments of the present disclosure will be described in detail.

In the present disclosure, the electric vehicle refers to a vehicle that is driven by an electric motor using a high voltage battery, and includes a hybrid electric vehicle (HEV), an electric vehicle (EV), a plug-in hybrid electric vehicle (PHEV), a fuel cell electric vehicle (FCEV), and the like.

Figure 1:
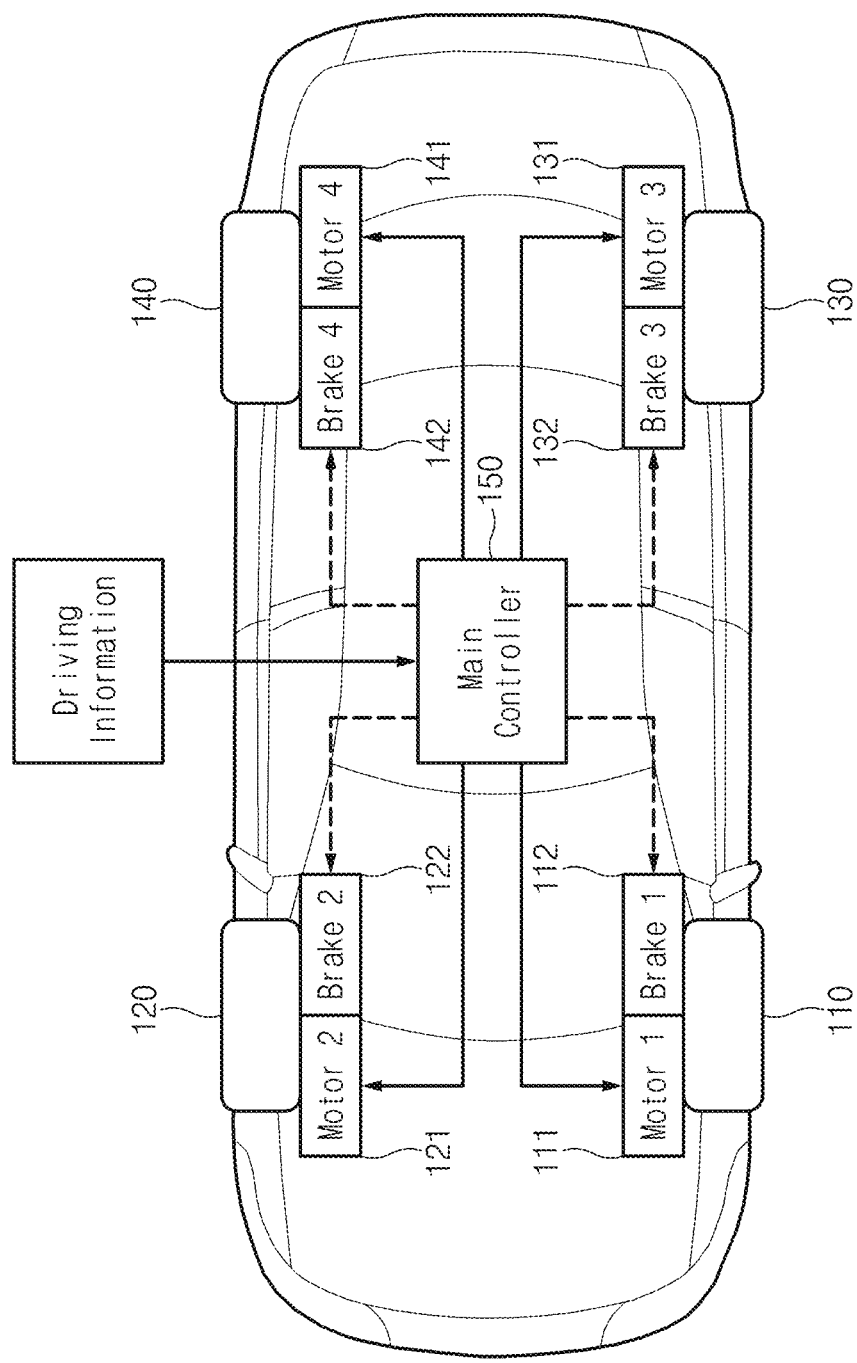
FIG. 1 is a drawing illustrating a configuration of a vehicle equipped with an in-wheel system, according to an embodiment of the present disclosure.

FIG. 1 is a drawing illustrating a configuration of an embodiment of a vehicle equipped with an in-wheel system, according to an embodiment of the present disclosure.

As illustrated in FIG. 1, according to an embodiment of the present disclosure, a vehicle with an in-wheel system includes a left-side front wheel 110, a right-side front wheel 120, a left-side rear wheel 130, a right-side rear wheel 140, and a controller 150.

The left-side front wheel 110 includes a first motor 111 and first brake 112 in or at the wheel. The right-side front wheel 120 includes a second motor 121 and a second brake 122 in or at the wheel. The left-side rear wheel 130 includes a third motor 131 and a third brake 132 in or at the wheel. The right-side rear wheel 140 includes a fourth motor 141 and a fourth brake 142 in or at the wheel. As disclosed herein, the first through fourth motors and brakes may be described as being in or at their respective wheels. This terminology is meant only to mean that the first through fourth motors and brakes are associated with their corresponding wheels. This terminology is not meant to limit the physical disposition or the assembled or installed relationship between the first through fourth motors and brakes and their corresponding wheels.

Herein, where the vehicle avoids a collision with an obstacle by turning to the left-side of the obstacle, cornering-inside wheels indicate the left-side front wheel 110 and the left-side rear wheel 130, and cornering-outside wheels indicate the right-side front wheel 120 and the right-side rear wheel 140. Likewise, where the vehicle avoids the collision with the obstacle by turning to the right-side of the obstacle, cornering-inside wheels indicate the right-side front wheel 120 and the right-side rear wheel 140, and cornering-outside wheels indicate the left-side front wheel 110 and the left-side rear wheel 130.

The controller 150 performs overall control required to avoid the collision with the obstacle by using the in-wheel system mounted in the vehicle.

The controller 150 may obtain various driving information from a vehicle network or various sensors mounted in the vehicle.

The vehicle network may include controller area network (CAN), local interconnect network (LIN), FlexRay, media oriented system transport (MOST), or the like.

In addition, the various driving information includes automatic emergency braking (AEB) information, blind spot detection (BSD) information, a steering angle, steering wheel angular velocity, vehicle speed, a yaw rate, lateral acceleration, a roll angle, and the like.

Figure 2:
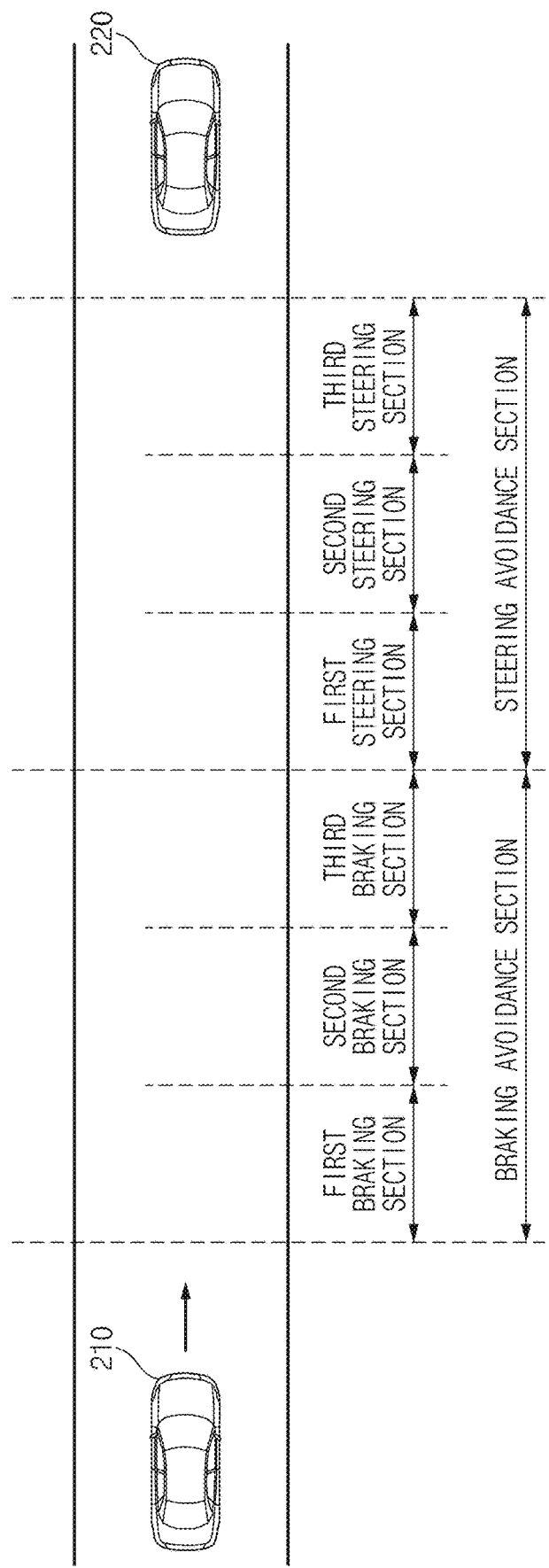
FIG. 2 is a drawing illustrating a braking avoidance section and a steering avoidance section, according to an embodiment of the present disclosure.

Furthermore, as illustrated in FIG. 2, the controller 150 may determine whether the vehicle enters a braking avoidance section. Also, where the vehicle enters the braking avoidance section, the controller 150 may determine whether a current section of the vehicle, i.e., where the vehicle is located in the braking avoidance section, is a first braking section, a second braking section, or a third braking section. Whether the vehicle enters each braking section may be determined based on time to collision (TTC), which is a value obtained by dividing a distance between the obstacle and the vehicle by relative velocity.

To satisfy a braking force required in each braking section, the controller 150 controls the motor by causing the motor to generate the braking force in addition to a braking force of a brake controlled by a driver. In this case, the controller 150 may control the braking force or the driving force generated by the motor by adjusting an amount of current applied to the motor. In addition, the controller 150 may further increase the braking force generated by the driver using the driver controlled brake, depending on the situation.

For example, if the braking force of the driver controlled brake satisfies a demanded braking force in the first braking section, the controller 150 may not cause the motor to generate additional braking force. If the braking force of the driver controlled brake does not satisfy the demanded braking force in the first braking section, the controller 150 may cause the motor to generate additional braking force. In this case, the torque of the motor is controlled such that the braking force of the motor does not exceed maximum 0.2 g.

If the braking force of the driver controlled brake satisfies the demanded braking force in the second braking section, the controller 150 may not cause the motor to generate additional braking force. If the braking force of the driver controlled brake does not satisfy the demanded braking force in the second braking section, the controller 150 may cause the motor to generate additional braking force. In this case, the torque of the motor is controlled such that the motor braking force does not exceed maximum 0.3 g.

If the braking force of the driver controlled brake satisfies demanded braking force in the third braking section, the controller 150 may not cause the motor to generate additional braking force. If the braking force of the driver controlled brake does not satisfy the demanded braking force in the third braking section, the controller 150 may cause the motor to maximally generate the braking force of the motor. In this case, the controller 150 may cause the motor to maximally generate the braking force of the brake regardless of the intention of the driver.

Meanwhile, as illustrated in FIG. 2, the controller 150 may determine whether the vehicle enters a steering avoidance section. Also, in the case where the vehicle enters the steering avoidance section, the controller 150 may determine that a current section of the vehicle, i.e., the location of the vehicle in the steering avoidance section, is a first steering section, a second steering section, or a third steering section. Whether the vehicle enters the steering avoidance section may be determined based on various driving information.

For example, if a degree (hereinafter referred to as a "yaw rate error") at which the yaw rate deviates from a reference value exceeds a first threshold value (e.g., 3 deg/s), if a lateral acceleration exceeds a second threshold value, if a value obtained by multiplying the yaw rate error and the lateral acceleration exceeds '0', if the vehicle speed exceeds a third threshold value, if a differential value of the lateral acceleration exceeds a fourth threshold value, if the steering angle exceeds a fifth threshold value, and if the steering wheel angular velocity exceeds a sixth threshold value, the controller 150 determines that the vehicle enters the steering avoidance section. In this case, the controller 150 operates in an emergency steering avoidance mode.

In addition, if the yaw rate error exceeds the first threshold value (e.g., 3 deg/s), the controller 150 determines that the current section of the vehicle is the first steering section.

Furthermore, if the yaw rate error exceeds a seventh threshold value (e.g., 5 deg/s), the controller 150 determines that the current section of the vehicle is the second steering section. In the case where a time period in which the yaw rate error exceeds the seventh threshold value is maintained for a specific time period or in the case where the yaw rate error exceeding the seventh threshold value continuously increases for a specific time period, the controller 150 determines that the current section of the vehicle is the second steering section.

Moreover, if the yaw rate error exceeds an eighth threshold value (e.g., 10 deg/s), the controller 150 determines that the current section of the vehicle is the third steering section.

In the case where a time period in which the yaw rate error exceeds the eighth threshold value is maintained for a specific time period or in the case where the yaw rate error exceeding the eighth threshold value continuously increases for a specific time period, the controller 150 determines that the current section of the vehicle is the third steering section.

Herein, each of the braking avoidance section and the steering avoidance section is a variable section determined by at least one or more of the following: speed of the vehicle; relative velocity of the obstacle; a distance between the obstacle and the vehicle; braking performance; steering performance; a tire state; and frictional force of a road. The braking avoidance section indicates a section required for emergency braking, and the steering avoidance section indicates a section required for emergency steering.

The controller 150 controls the torque of the motor mounted in or at each wheel to satisfy a yaw moment required in each steering section. In the case where the steering is generated by a driver, the controller 150 controls the torque of the motor mounted in or at each wheel such that the yaw moment is generated by an amount of shortage of braking force compared with the demanded braking force.

Figure 3:
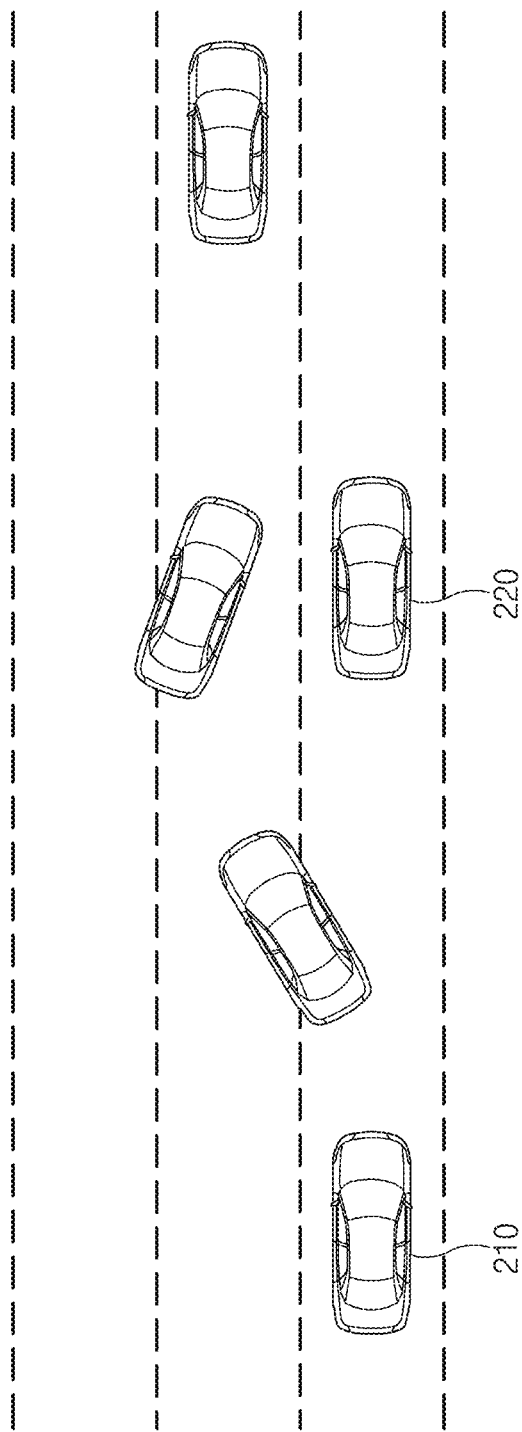
FIG. 3 is a drawing for describing a process in which an obstacle is avoided in a steering avoidance section, according to an embodiment of the present disclosure.

Hereinafter, a process in which a vehicle 210 avoids collision with an obstacle 220 by turning to the left-side of the obstacle 220 in each steering section will be described with reference to FIG. 3. In this case, the motor of each wheel generates the driving force.

[A First Steering Section]

The controller 150 maintains the driving force of a cornering-inside front wheel and maintains the driving force of each of the cornering-outside front wheel and the cornering-outside rear wheel. In other words, the controller 150 maintains the driving force of each motor by maintaining the torque of each of the first motor 111 mounted in or at the left-side front wheel 110, the second motor 121 mounted in or at the right-side front wheel 120, and the fourth motor 141 mounted in or at the right-side rear wheel 140.

On the other hand, the controller 150 decreases the torque of the third motor 131 such that the third motor 131 mounted in or at the left-side rear wheel 130 generates the braking force. Since the rotation speed of the third motor 131 is slower than the rotation speed of the left-side rear wheel 130 if the torque of the third motor 131 is decreased, the third motor 131 acts as a load to generate the braking force.

[A Second Steering Section]

The controller 150 maintains the driving force of each of the cornering-outside front wheel and the cornering-outside rear wheel. In other words, the controller 150 maintains the driving force of each motor by maintaining the torque of each of the second motor 121 mounted in or at the right-side front wheel 120 and the fourth motor 141 mounted in or at the right-side rear wheel 140.

On the other hand, the controller 150 may decrease the torque of the first motor 111 such that the first motor 111 mounted in the left-side front wheel 110 generates the braking force. Also, the controller 150 may decrease the torque of the third motor 131 such that the third motor 131 mounted in or at the left-side rear wheel 130 generates the braking force. In this case, torque decrement of the first motor 111 and torque decrement of the third motor 131 are enough to generate the braking force. In an embodiment, it may be preferable for the torque decrement of the first motor 111 to be set smaller than the torque decrement of the third motor 131. In other words, the controller 150 may decrease the torque of the third motor 131 further or more than the torque of the first motor 111.

[A Third Steering Section]

The controller 150 decreases the driving force of the cornering-outside front wheel and increases the driving force of the cornering-outside rear wheel. That is, the controller 150 decreases the driving force of the second motor 121 by decreasing the torque of the second motor 121 mounted in or at the right-side front wheel 120. Also, the controller 150 increases the driving force of the fourth motor 141 by increasing the torque of the fourth motor 141 mounted in or at the right-side rear wheel 140. In this case, the controller 150 adjusts the torque of the second motor 121 such that only an amount of the driving force is reduced without generating the braking force by the second motor 121.

Moreover, the controller 150 may control the cornering-inside front wheel and the cornering-inside rear wheel to generate the braking force. In other words, the controller 150 may decrease the torque of the first motor 111 such that the first motor 111 mounted in or at the left-side front wheel 110 generates the braking force. The controller 150 may decrease the torque of the third motor 131 such that the third motor 131 mounted in or at the left-side rear wheel 130 generates the braking force. In this case, torque decrement of the first motor 111 and torque decrement of the third motor 131 is enough to generate the braking force. In an embodiment, it may be preferable for the torque decrement of the first motor 111 to be set smaller than the torque decrement of the third motor 131. In other words, the controller 150 may decrease the torque of the third motor 131 further or more than the torque of the first motor 111.

In this disclosure, the process in which the vehicle 210 avoids collision with the obstacle 220 by turning to the right-side of the obstacle 220 in each steering section may be easily drawn through the above-described process.

The controller 150 may perform a process in which movement of the vehicle is stabilized after avoiding the collision with the obstacle through emergency steering.

First, the controller 150 determines whether to perform a process in which the movement of the vehicle is stabilized after avoiding the collision with the obstacle through the emergency steering.

For example, in the case where the lateral acceleration is less than a ninth threshold value, the yaw rate error is greater than a tenth threshold value, and the roll angle is greater than an eleventh threshold value (hereinafter referred to as a "first condition"), and in the case where the lateral acceleration is less than the ninth threshold value and a slip angle of the vehicle is greater than a twelfth threshold value (hereinafter referred to as a "second condition"), the controller 150 operates in a movement stabilization mode of the vehicle.

In the case of the first condition, the controller 150 maintains the torque of each of the first motor 111 of the left-side front wheel 110, the third motor 131 of the left-side rear wheel 130, and the fourth motor 141 of the right-side rear wheel 140 of the vehicle. In this case, the controller 150 also controls the torque of the second motor 121 such that the second motor 121 of the right-side front wheel 120 generates the braking force.

In the case of the second condition, the controller 150 maintains the torque of each of the first motor 111 of the left-side front wheel 110 and the third motor 131 of the left-side rear wheel 130 of the vehicle. The controller 150 also controls the torque of the second motor 121 such that the second motor 121 of the right-side front wheel 120 generates the braking force. The controller 150 further controls the torque of the fourth motor 141 such that the fourth motor 141 of the right-side rear wheel 140 generates the braking force.

In the case where the lateral acceleration is greater than the ninth threshold value, the movement stabilization process of the vehicle may be implemented such as with an electronic stability control (ESC) system mounted in the vehicle.

Figure 4:
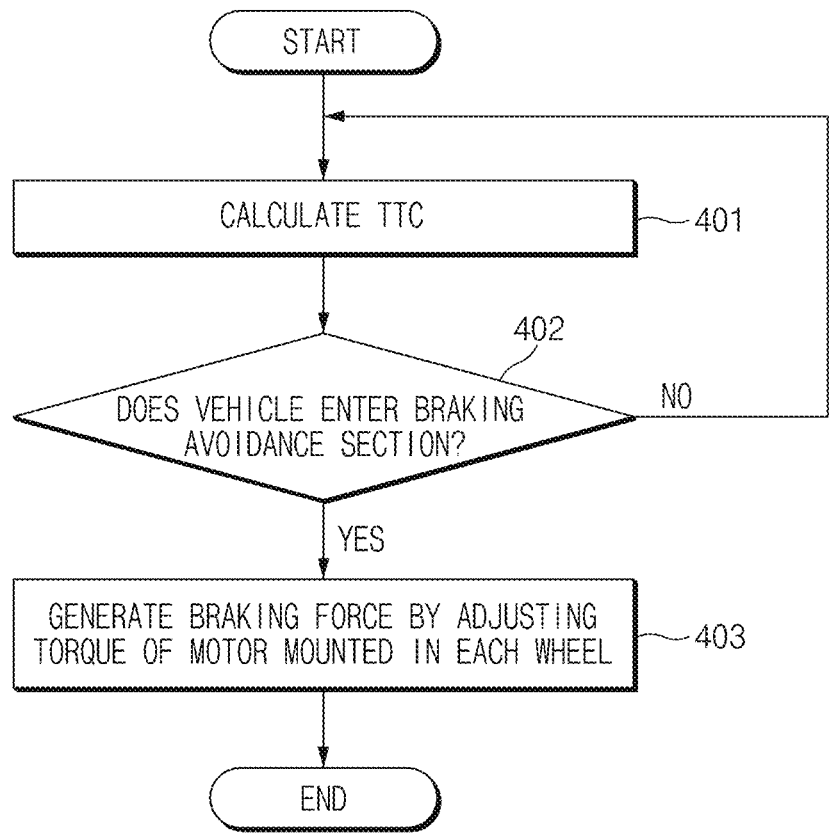
FIG. 4 is a flowchart illustrating a driving controlling method of a vehicle using an in-wheel system, according to an embodiment of the present disclosure.

FIG. 4 is a flowchart illustrating an embodiment of a driving controlling method of a vehicle using an in-wheel system, according to an embodiment of the present disclosure. FIG. 4 illustrates a process in which the controller 150 controls a braking force of a motor mounted in or at each wheel such that the vehicle avoids collision with an obstacle.

In operation 401, the controller 150 calculates TTC by dividing a distance between the vehicle and the obstacle, which is located in front of the vehicle, by relative velocity.

In operation 402, the controller 150 determines whether the vehicle enters a braking avoidance section, based on the calculated TTC.

If the result determined in operation 402 indicates that the vehicle does not enter the braking avoidance section, the procedure proceeds to operation 401.

If the result determined in operation 402 indicates that the vehicle enters the braking avoidance section, the controller 150, in operation 403, uniformly controls the torque of the motor mounted in each wheel such that the braking force of a brake is generated by an amount of shortage compared with demanded braking force.

In this case, the controller 150 may control the torque of the motor by dividing the braking avoidance section into a first braking section, a second braking section, and a third braking section in detail.

For example, if the braking force of the driver controlled brake satisfies a demanded braking force in the first braking section, the controller 150 may not cause the motor to generate additional braking force. If the braking force of the driver controlled brake does not satisfy the demanded braking force in the first braking section, the controller 150 may cause the motor to generate additional braking force. In this case, the torque of the motor is controlled such that the braking force of the motor does not exceed maximum 0.2 g.

If the braking force of the driver controlled brake satisfies a demanded braking force in the second braking section, the controller 150 may not cause the motor to generate additional braking force. If the braking force of the driver controlled brake does not satisfy the demanded braking force in the second braking section, the controller 150 may cause the motor to generate additional braking force. In this case, the torque of the motor is controlled such that the braking force of the motor does not exceed maximum 0.3 g.

If the braking force of the driver controlled brake satisfies a demanded braking force in the third braking section, the controller 150 may not cause the motor to generate additional braking force. If the braking force of the brake does not satisfy the demanded braking force in the third braking section, the controller 150 may cause the motor to generate additional braking force. In this case, the controller 150 may cause the motor to maximally generate the braking force of the brake regardless of the intention of the driver.

Figure 5:
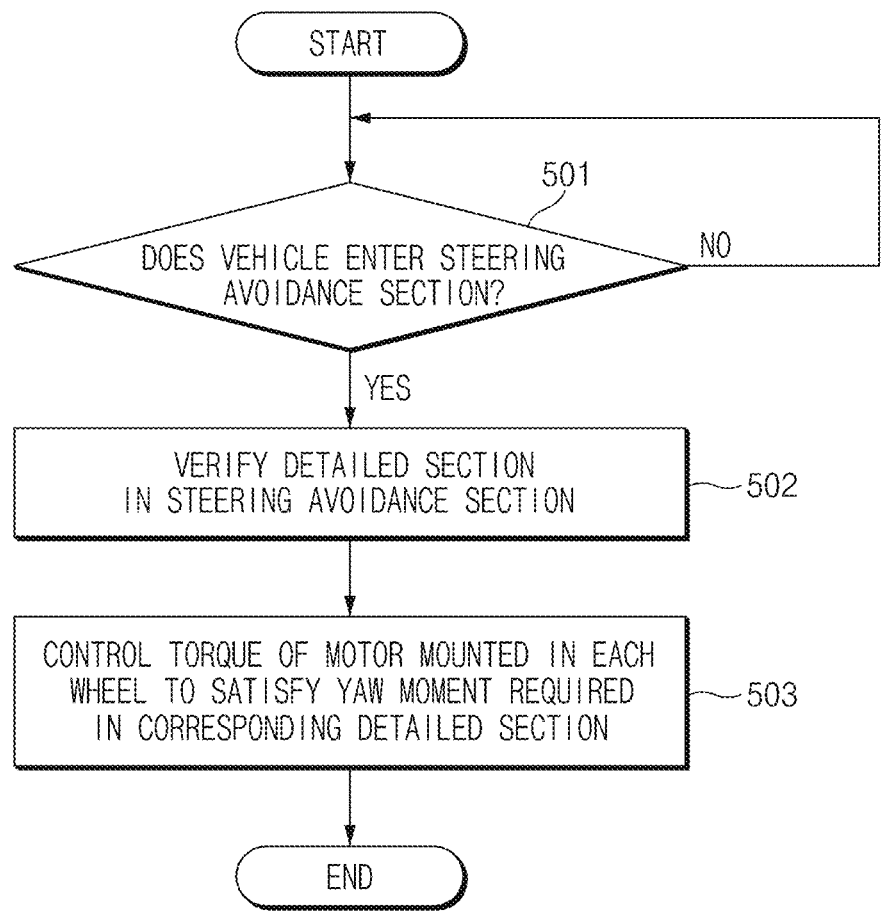
FIG. 5 is a flowchart illustrating a driving controlling method of a vehicle using an in-wheel system, according to an embodiment of the present disclosure.

FIG. 5 is a flowchart illustrating an embodiment of a driving controlling method of a vehicle using an in-wheel system, according to another embodiment of the present disclosure. FIG. 5 illustrates a process in which the controller 150 controls the torque of a motor mounted in or at each wheel such that the vehicle avoids a collision with an obstacle.

Figure 6:
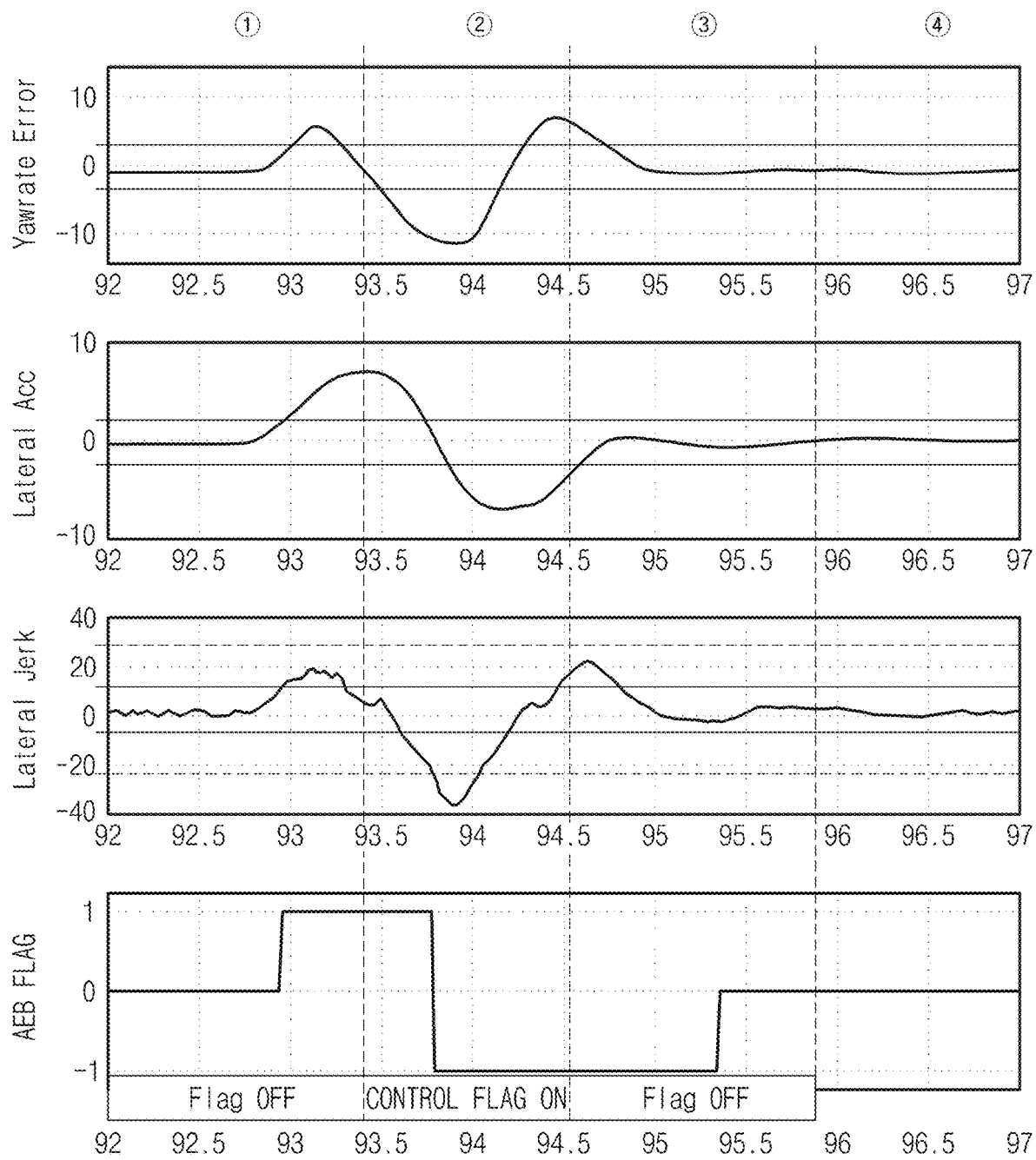
FIG. 6 is a drawing for describing a condition for determining whether a vehicle enters a steering avoidance section, according to an embodiment of the present disclosure.

In operation 501, the controller 150 determines whether the vehicle enters a steering avoidance section, based on driving information of the vehicle. In FIG. 6, a section ① and a section ③ indicate a section in which it is determined that the vehicle does not enter the steering avoidance section. A section ② indicates a section in which it is determined that the vehicle enters the steering avoidance section. A section ④ indicates a section in which emergency steering avoidance is ended.

In operation 502, if the vehicle enters the steering avoidance section, the controller 150 verifies the vehicle's current detailed or specific section in the steering avoidance section.

In operation 503, the controller 150 controls the torque of the motor mounted in or at each wheel to satisfy a yaw moment required in the verified detailed or specific section. In this case, the required yaw moment may be a value obtained by subtracting the yaw moment generated by the steering of a driver from the whole yaw moment necessary to avoid the collision.

The above-mentioned method of the present disclosure may be implemented as a computer program. Codes and code segments constituting the computer program may be readily inferred by a computer programmer in the field. In addition, the computer program may be stored in a computer-readable recording media, information storage media, and may be read and executed by a computer, thereby implementing the method of the present disclosure. The recording media includes all types of recording media that are computer-readable.

The present disclosure is capable of improving performance of avoiding a collision with an obstacle by independently controlling a motor mounted in or at each wheel of an electric vehicle such that the collision with the obstacle is avoided.

In addition, the present disclosure is capable of stabilizing movement of the vehicle after the avoidance of the collision with the obstacle.

While the inventive concept has been described with reference to example embodiments, it will be apparent to those having ordinary skill in the art that various changes and modifications may be made without departing from the spirit and scope of the disclosure.

What is claimed is:

1. A method of controlling driving of a vehicle using an in-wheel system, the method comprising:
    calculating a time to collision (TTC) by dividing a distance between the vehicle and an obstacle located in front of the vehicle by relative velocity;
    determining whether the vehicle enters a braking avoidance section, based on the calculated TTC; and
    generating, by a motor mounted in each wheel, a braking force of a brake by an amount of a shortage of braking force of the brake compared with a demanded braking force when the vehicle enters the braking avoidance section,
    wherein the braking avoidance section is divided into a first braking section, a second braking section, and a third braking section, based on the TTC, and
    wherein the generating of the braking force includes generating, by the motor mounted in each wheel, different braking force in the first braking section, the second braking section, and the third braking section.

2. The method of claim 1, wherein the generating of the braking force by the motor mounted in each wheel includes:
    generating, by the motor mounted in each wheel, the braking force within a first limit value in the first braking section.

3. The method of claim 1, wherein the generating of the braking force of the brake by the motor mounted in each wheel includes:

generating, by the motor mounted in each wheel, the braking force within a second limit value in the second braking section, wherein the second limit value is greater than a first limit value.

4. The method of claim 1, wherein the generating of the braking force of the brake by the motor mounted in each wheel includes:

generating, by the motor mounted in each wheel, the braking force without limit in the third braking section.

* * * * *